United States Patent
Yu et al.

(10) Patent No.: US 11,283,785 B2
(45) Date of Patent: Mar. 22, 2022

(54) SYSTEMS AND METHODS FOR CREDENTIAL CONTROL AMONG A PLURALITY OF CLIENT DEVICES

(71) Applicant: Citrix Systems, Inc., Fort Lauderdale, FL (US)

(72) Inventors: Yedong Yu, Nanjing (CN); Hanyi Li, Nanjing (CN); Qiaofei Zhu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 232 days.

(21) Appl. No.: 16/580,250

(22) Filed: Sep. 24, 2019

(65) Prior Publication Data

US 2021/0092105 A1 Mar. 25, 2021

(51) Int. Cl.
| | |
|---|---|
| *H04L 29/06* | (2006.01) |
| *H04L 29/08* | (2006.01) |
| *H04L 12/24* | (2006.01) |
| *H04L 67/306* | (2022.01) |
| *H04L 41/046* | (2022.01) |
| *H04L 67/01* | (2022.01) |
| *H04L 67/54* | (2022.01) |

(52) U.S. Cl.
CPC ............ *H04L 63/08* (2013.01); *H04L 41/046* (2013.01); *H04L 67/24* (2013.01); *H04L 67/306* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 10,064,055 B2 * | 8/2018 | Raleigh | ................... | G06F 8/65 |
| 10,841,839 B2 * | 11/2020 | Raleigh | ................. | H04M 15/47 |
| 11,050,749 B2 * | 6/2021 | Ju | ....................... | G06Q 20/3821 |
| 2002/0184351 A1 * | 12/2002 | Istvan | ............... | H04N 21/26613 |
| | | | | 709/222 |
| 2014/0101437 A1 * | 4/2014 | Kube | .................. | G06Q 50/2057 |
| | | | | 713/155 |
| 2014/0189818 A1 * | 7/2014 | Meyer | ...................... | H04L 63/08 |
| | | | | 726/4 |
| 2014/0273965 A1 * | 9/2014 | Raleigh | ................... | H04L 63/08 |
| | | | | 455/411 |
| 2014/0304836 A1 * | 10/2014 | Velamoor | ............... | H04L 63/08 |
| | | | | 726/28 |

(Continued)

*Primary Examiner* — Davoud A Zand
(74) *Attorney, Agent, or Firm* — Foley & Lardner LLP

(57) ABSTRACT

Disclosed herein includes a system, a method, and a device for credential control among a plurality of client devices. A server can receive a modification to a credential for an identifier associated with a user of an application accessed via a first client device. The credential can be used for authenticating to the application by the user. The server can store the modification to the credential to a login history for the user. The login history can identify client devices and one or more applications accessed via the client devices by the user using the credential. The server can identify, using the login history, client devices through which applications are accessed by the user using the credential. The server can communicate the modification to the credential to the client devices to indicate to the user to update the credential using the modified credential on each of the client devices.

20 Claims, 7 Drawing Sheets

(56) References Cited

U.S. PATENT DOCUMENTS

| | | | |
|---|---|---|---|
| 2015/0106887 A1* | 4/2015 | Aslund | H04W 12/06 726/5 |
| 2015/0120767 A1* | 4/2015 | Skeen | G06F 16/639 707/754 |
| 2015/0319185 A1* | 11/2015 | Kirti | H04L 67/306 726/23 |

* cited by examiner

SYSTEMS AND METHODS FOR CREDENTIAL CONTROL AMONG A PLURALITY OF CLIENT DEVICES

FIELD OF DISCLOSURE

The present disclosure is generally related to systems and methods, including but not limited to systems and methods for credential control among a plurality of client devices.

BACKGROUND

In a work environment or network, employees can be provided or required to have passwords to interact with different content provided through the work network. For security reasons, the employees can be required to change these passwords at different times and on different devices. If an employee changes a password on a first device, they may forget to change the same password on a second device. Therefore, if the employee attempts to login to the second device or access content via the second device the employee can be locked out or prevented from accessing the work network.

SUMMARY

Devices, systems and methods for credential control among a plurality of client devices and applications are provided herein. A credential manager executing on a sever can receive a modification or change to a credential associated with an identifier of a user at a first application accessed by the user using the credential and/or a first client device used by the user to access the first application. The credential manager can update, propagate or communicate the modification to the credential at a plurality of applications (e.g., different from the first application) previously accessed by the user using the previous credential and/or a plurality of client devices (e.g., different from the first client device) used by the user to access the plurality of applications. For example, the credential manager can maintain a login history for a plurality of users that can be organized based in part on an identifier associated with each user and a credential associated with the identifier and used to authenticate to one or more applications via one or more client devices. The login history can identify one or more applications and one or more client devices the respective user accessed and the credential used to access the one or more applications by the user. When a modification or change to a credential is received, the modification to the credential can be updated at the different applications or different client devices identified in the login history to reduce or prevent the user from being locked out from accessing the applications or client devices after modifying the credential via the first application and/or first client device. In some embodiments, the credential can be updated with the modification automatically by the credential manager such that the user does not need to individually modify the credential at the plurality of applications and/or client devices.

In at least one aspect, a method for credential control among a plurality of client devices is provided. The method can include receiving, by a server, a modification to a credential for an identifier associated with a user of an application accessed via a first client device. The credential can be used for authenticating to the application of one or more applications accessed by the user across a plurality of client devices. The method can include storing, by the server, the modification to the credential to a login history for the user. The login history can identify the plurality of client devices and one or more applications accessed via the plurality of client devices by the user using the credential. The method can include identifying, by the server using the login history, one or more client devices of the plurality of client devices through which the application of the one or more applications is accessed by the user using the credential. The method can include communicating, by the server, the modification to the credential to the one or more client devices to indicate to the user to update the credential using the modified credential on each of the one or more client devices.

In embodiments, the method can include generating, by the server, a listing to map the one or more applications accessed by the user using the credential to respective ones of the plurality of client devices according to a login event at the respective ones of the plurality of client devices using the credential. The method can include receiving, by the server via an agent executing on the first client device, a selection indicating at least one application of the plurality of applications to communicate the modification to the credential for the at least one application via at least one client device of the plurality of client devices. The method can include receiving, by the server via an agent executing on the first client device, an indication that the credential was updated for at least one application executing on the first client device. The method can include updating, by the server, the login history for the user to indicate the credential was updated to include the modification for at least one application executing on the first client device.

In some embodiments, the method can include determining, by the server, that the modification to the credential was unsuccessful at the first client device for at least one application of the one or more applications accessed by the user. The method can include providing, by the server to an agent executing on the first client device, an instruction to update the credential at the first client device for the at least one application of the one or more applications accessed by the user. The method can include generating, by the server, a listing that includes a status for the plurality of client devices and the one or more applications accessed by the user across the plurality of client devices. The status can be indicative of the modification to the credential being received at respective ones of the plurality of client devices and the one or more applications.

In embodiments, the method can include updating, by the server, the credential to include the modification at the one more client devices associated with the user and connected to the server. The method can include detecting, by the server, a first group of client devices of the plurality of client devices associated with the user are offline. The method can include updating, by the server, the credential to include the modification at the first group of client devices of the one or more client devices responsive to the status of respective ones of the first group of client devices changing from offline to online.

In at least one aspect, a method for credential control is provided. The method can include receiving, by an agent executing on a first client device, a modification of a first credential to change the first credential to a second credential for an identifier associated with a user of the first client device. The method can include providing, by the agent to the user via the first client device, a listing identifying a plurality of applications accessed by the user using the first credential and accessible via the first client device. The method can include receiving, by the agent, a selection of one or more applications of the plurality of applications from the listing. The method can include changing, by the agent, the first credential to the second credential for the selected one or more applications of the plurality of applications at the first client device.

In some embodiments, the method can include providing, by the agent to the user of the client device, the listing identifying a plurality of client devices associated with the user and accessed using the first credential. The method can include providing, by the agent to a server, a selection of one or more client devices of the plurality of client devices to update the first credential to the second credential at the one or more client devices. The method can include transmitting, by the agent to a server, a request for a login history for the user and associated with the credential. The login history can include the plurality of applications accessed by the user using the first credential within a determined time period and a plurality of client devices associated with the user and accessed using the first credential with the determined time period. The method can include encrypting, by the agent, the second credential. The method can include transmitting, by the agent to a server, the encrypted second credential to be stored in a user profile for the user at a database of the server.

In embodiments, the method can include determining, by the agent, if the first credential was updated to the second credential at the selected one or more applications of the plurality of applications at the first client device. The method can include providing, by the agent to a server, an indication that the first credential was updated the second credential at respective ones of the selected one or more applications of the plurality of applications at the first client device. The method can include determining, by the agent, that the first credential did not update to the second credential at the selected one or more applications of the plurality of applications at the first client device. The method can include receiving, by the agent from a server, an instruction to manually update the first credential to the second credential for respective ones of the selected one or more applications of the plurality of applications at the first client device.

In at least one aspect, a system for credential control is provided. The system can include a server having one or more processors coupled to a memory. The one or more processors can be configured to receive a modification to a credential for an identifier associated with a user of an application accessed via a first client device. The credential can be used for authenticating to the application of one or more applications accessed by the user across a plurality of client devices. The one or more processors can be configured to store the modification to the credential to a login history for the user. The login history can identify the plurality of client devices and one or more applications accessed via the plurality of client devices by the user using the credential. The one or more processors can be configured to identify, using the login history, one or more client devices of the plurality of client devices through which the application of the one or more applications is accessed by the user using the credential. The one or more processors can be configured to communicate the modification to the credential to the one or more client devices to indicate to the user to update the credential using the modified credential on each of the one or more client devices.

In some embodiments, the one or more processors can be configured to generate a listing to map the one or more applications accessed by the user using the credential to respective ones of the plurality of client devices according to a login event at the respective ones of the plurality of client devices using the credential. The one or more processors can be configured to receive, via an agent executing on the first client device, an indication that the credential was updated for at least one application executing on the first client device. The one or more processors can be configured to update the login history for the user to indicate the credential was updated to include the modification for at least one application executing on the first client device.

In embodiments, the one or more processors can be configured to determine that the modification to the credential was unsuccessful at the first client device for at least one application of the one or more applications accessed by the user. The one or more processors can be configured to provide, to an agent executing on the first client device, an instruction to update the credential at the first client device for the at least one application of the one or more applications accessed by the user. The one or more processors can be configured to detect a first group of client devices of the plurality of client devices associated with the user are offline. The one or more processors can be configured to update the credential to include the modification at the first group of client devices of the one or more client devices responsive to the status of respective ones of the first group of client devices changing from offline to online.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes a network environment and computing environment which may be useful for practicing embodiments described herein.

Section B describes embodiments of devices, systems and methods for credential control among a plurality of client devices.

A. Computing Environment

Figure 1A:
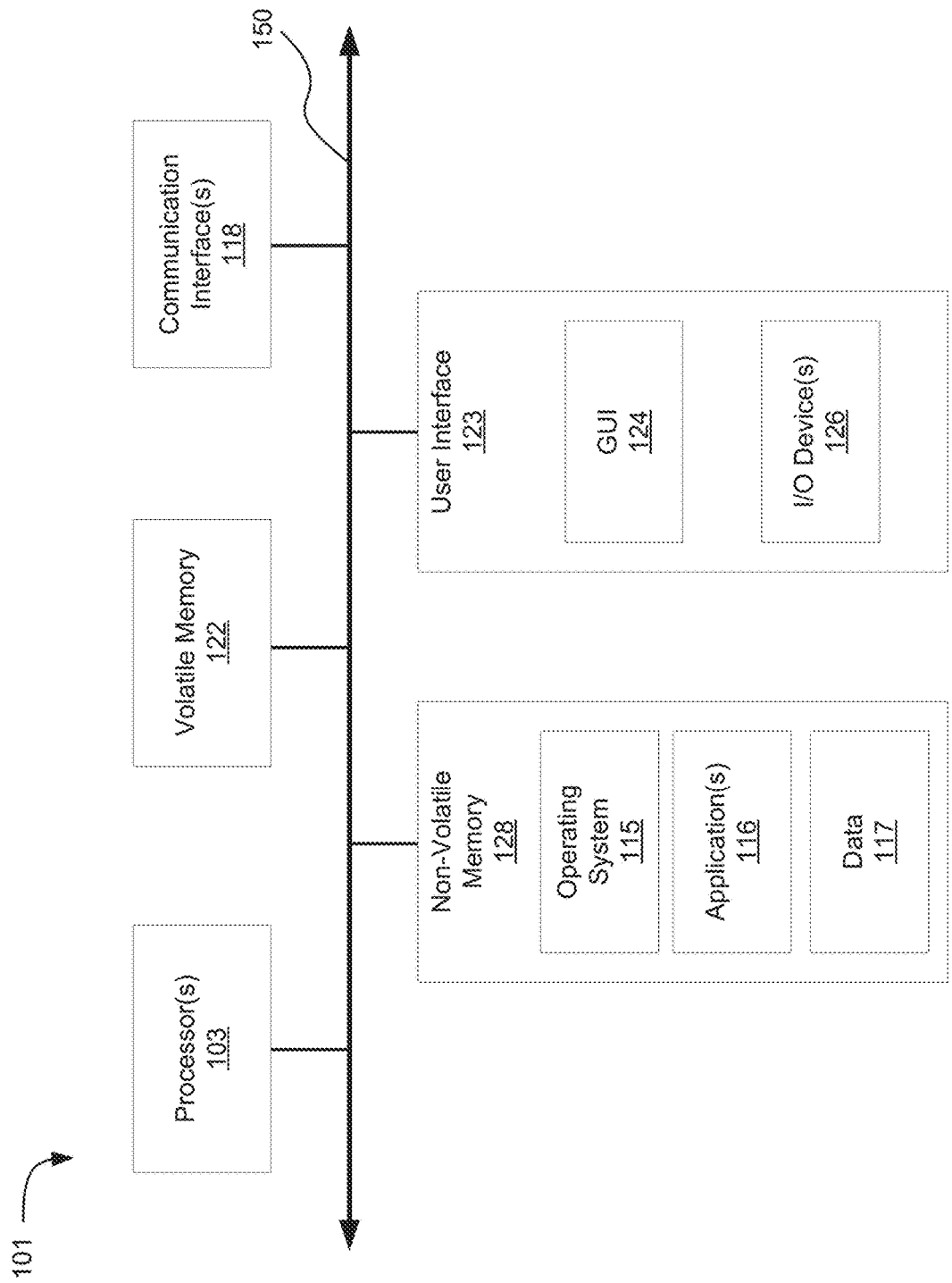
FIG. 1A is a block diagram of embodiments of a computing device.

As shown in FIG. 1A, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Figure 1B:
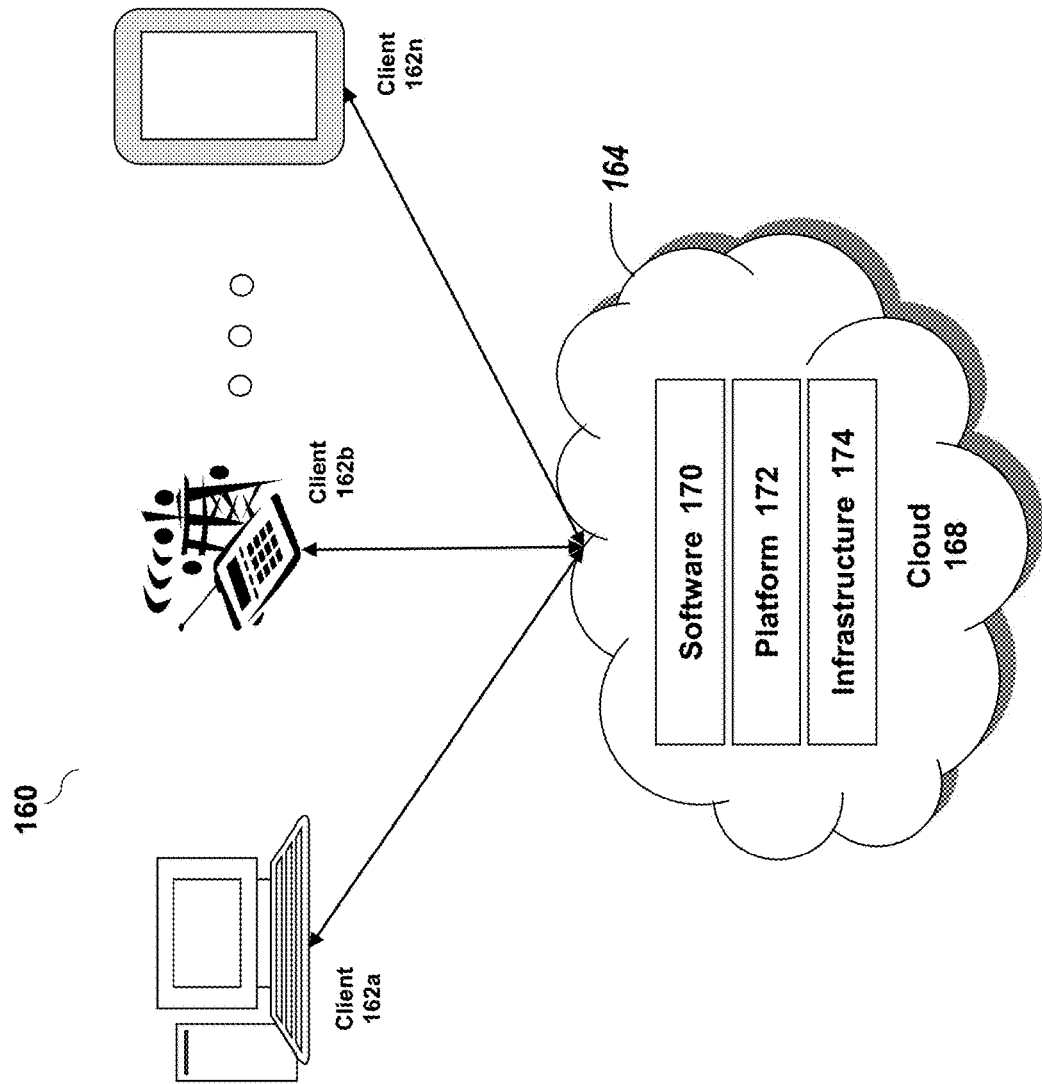
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide client 162 with one or more resources provided by a network environment. The computing environment 162 may include one or more clients 162a-162n, in communication with a cloud 168 over one or more networks 164. Clients 162 may include, e.g., thick clients, thin clients, and zero clients. The cloud 108 may include back end platforms, e.g., servers 106, storage, server farms or data centers. The clients 162 can be the same as or substantially similar to computer 101 of FIG. 1A.

The users or clients 162 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 108 may be public, private, or hybrid. Public clouds 108 may include public servers that are maintained by third parties to the clients 162 or the owners of the clients 162. The servers may be located off-site in remote geographical locations as disclosed above or otherwise. Public clouds 168 may be connected to the servers over a public network 164. Private clouds 168 may include private servers that are physically maintained by clients 162 or owners of clients 162. Private clouds 168 may be connected to the servers over a private network 164. Hybrid clouds 168 may include both the private and public networks 164 and servers.

The cloud 168 may include back end platforms, e.g., servers, storage, server farms or data centers. For example, the cloud 168 can include or correspond to a server or system remote from one or more clients 162 to provide third party control over a pool of shared services and resources. The computing environment 160 can provide resource pooling to serve multiple users via clients 162 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 162. The computing environment 160 can provide an elasticity to dynamically scale out or scale in responsive to different demands from one or more clients 162. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include serverless computing. The computing environment 160 can include Software as a service (SaaS). For example, the cloud 168 may also include a cloud based delivery, e.g. Software as a Service (SaaS) 170, Platform as a Service (PaaS) 172, and Infrastructure as a Service (IaaS) 174. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., Google Compute Engine provided by Google Inc. of Mountain View, Calif., or others. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and others. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALES-FORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft ONEDRIVE provided by Microsoft Corporation, Google Drive provided by Google Inc., or Apple ICLOUD provided by Apple Inc. of Cupertino, Calif.

Clients 162 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 162 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 162 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 162 may also access SaaS resources through smartphone or tablet applications, including, e.g., Salesforce Sales Cloud, or Google Drive app. Clients 162 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Credential Control

Devices, systems and methods for credential control among a plurality of client devices and applications are provided herein. In embodiments, a credential manager executing on a server can receive a modification to a credential for a user and communicate or modify the credential for the user at a plurality of applications and/or client devices accessed by the user responsive to receiving the modification. The credential manager can maintain a credential account for a plurality of users that maps an identifier for the user, at least one credential for the user and one or more applications accessed by the user with the credential (e.g., to authenticate) and one or more client devices used to access the one or more applications. When a user authenticates to a device or application using the credential account or the credential, the information or data associated with the login event can be saved, stored and maintained by the credential manager in the credential account for the respective user. When the user modifies or changes the password, the credential manager can propagate or communicate the modification to the credential to the one or more applications and one or more client devices identified in the credential account.

In some embodiments, the user can modify the credential within a console of a client device or through an agent executing on a client device and connected to the server. The server can provide the agent a listing or login history for the user identifying the one or more applications accessed by the user with the credential and one or more client devices used to access the one or more applications and therefore still using the previous or unmodified credential. The user can select, through the agent, the applications and/or client devices to update the credential with the modification. The credential manager, responsive to the selection, can update the credential with the modification at each of the selected applications and/or client devices used to access the selected applications. In some embodiments, the modification to the credential can be encrypted by the agent and transmitted to the credential manager and/or encrypted by the credential manager and transmitted to the one or more client devices associated with the user. In embodiments, if the update to the credential is successful, the credential manager can update a status for the application and/or client device to indicate that the credential has been updated with the modification at the respective application and/or client device. For example, the status of the applications and/or client devices associated with the user can be provided to the user through a user interface provided by the agent executing on the client device.

In embodiments, if the update to the credential can unsuccessful for an application, for example, if the respective client device used to access the application is offline or otherwise can't be reached by the server. In such embodiments, the credential manager can update a status for the application and/or client device to indicate that the credential has still needs to be updated or that the update failed at the respective application and/or client device. For example, the status of the applications and/or client devices associated with the user can be provided to the user through a user interface provided by the agent executing on the client device. When the respective client device is online again or reachable from the server, the credential manager can update the credential with the modification for the application and/or client device. Thus, the devices, systems and methods described herein can provide credential control for a user across a plurality of client devices and a plurality of applications accessed by the user to reduce or prevent issues with the user being locked out of applications after modifying the credential.

For example, for security reasons, employees maintain their own domain credential account to access or login to an internal website of a company (e.g., workplace) or access confidential content or files. The company can maintain a domain controller or credential controller to manage and control the user accounts of each employee. In some embodiments, the company can implement policies such as requiring credentials (e.g., passwords) to be modified or changed at determined intervals (e.g., every 3 months, after 100 login events, etc.). Thus, the employees can be prompted to modify a credential according the determine intervals and can modify the credential at one client device or through one application accessed via a client device. However, the employee may forget to modify the credential at one or more other applications associated with their credential account and/or one or more other client devices associated with their credential account. For example, the employees may modify the credential using an application and/or client device they access less frequently and save the modification on the respective application and/or client device such that the employee may forget the credential was modified when accessing other applications and/or client devices. Some applications (e.g., software applications, web applications) that don't use single sign-on may attempt to login using the previous or old credential and after a certain number of failed login attempts, the account can be locked.

Devices, systems and methods described herein can update a modification to a credential for a user across a plurality of applications accessed by the user with the credential and/or across a plurality of client devices used to access the plurality of applications. The credential can be modified at multiple applications and devices associated with the user based in part on a login history of the user to reduce or prevent user from getting locked out when attempting to login to different applications and/or client devices after modifying the credential. For example, the login activity for a user can be tracked for one or more applications accessed using a plurality of client devices that are accessed using an identifier associated with the user and a credential for the identifier. A login history can be generated and maintained for the user at the server and the login history can track one or more login events to one or more applications by the user using the identifier and the credential. In some embodiments, the user can request the login history from the server (e.g., credential manager), for example, after a modification to the credential to identify any applications or client devices the user may be at risk of being locked out from or that the credential hasn't been updated with the modification at the respective application or client device.

In some embodiments, the modification to the credential can be automatically updated at one or more applications and/or at one or more client devices when the modification to the credential is made or within a determined time period from when the modification to the credential is made. Thus, the user can be prevented from being locked out of accounts for the one or more applications and/or at one or more client devices accessed with the credential in advance of a next or subsequent login event.

Figure 2A:
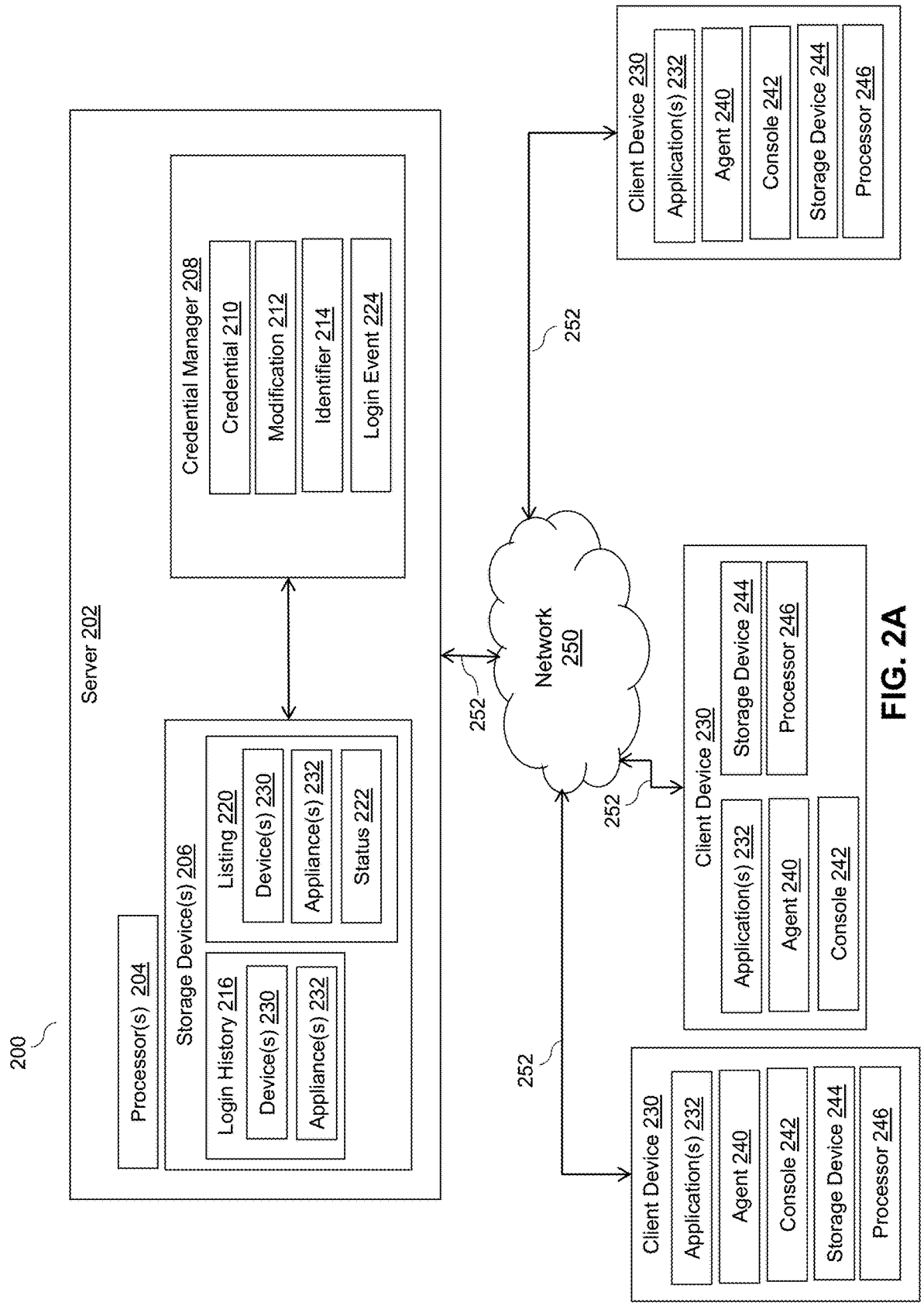
FIG. 2A is a block diagram of a system for credential control among a plurality of client devices, according to an example implementation of the present disclosure.

Referring now to FIG. 2A, an example system 200 for credential control is provided. In brief overview, the system 200 can include a server 202 having a credential manager 208 to manage and update a credential 210 for a user across a plurality of client devices 230 accessed by the user and a plurality of applications 232 interacted with by the user. For example, the credential manager 208 can communicate or provide a modification 212 to a credential 210 for the user to agents 240 executing at the client devices 230 and to update for the applications 232 accessed by the user via the client devices 230.

The server 202 can be disposed in a network 250 and connect with one or more client devices 230 associated with one or more users to manage, maintain and/or update credentials 210 for the users. The server 202 can include one or more processors 204 such as but not limited to processor(s) 103 described above with respect to FIG. 1A. The one or more processors 204 can execute or perform the functionalities of the method 300. The server 202 can include one or more storage devices 206 (e.g., memory). For example, the server 202 can include a storage device 206 or memory coupled with one or more processors 204. The storage devices 206 can be the same as or similar to memory 122, 128 described above with respect to FIG. 1A. The server 202 can store and maintain a login history 216 for a user, one or more listings 220, one or more credentials 210 for a user, and one or more modifications 212 to credentials 210 in the storage device 206.

The login history 216 can include in a table or database to store information corresponding to client devices 230 and/or applications 232 associated with a user. For example, the login history 216 can include a plurality of entries with each entry or portion corresponding to or designated for a particular user. The entry for a user can identify or list the client devices 230 the respective user has registered with the server 202, used to connect to or access the server 202 and/or used to access or interact with one or more applications 232. The entry for a user can identify or list the applications 232 that the respective user has registered with the server 202, connected to or interacted with and/or previously authenticated to via the one more client devices 230. In some embodiments, the login history 216 can include information for a particular time period or time frame (e.g., past three months, past six months, past year) For example, the server 202 can maintain a login history 216 based in part on information collected about the user activities within the time period or time frame. The server 202 can periodically update the login history 216 for user to remove information (e.g., application data, client device data) collected outside or before the time period or time frame. The server 202 can periodically update the login history 216 for user to add or include new information (e.g., application data, client device data) collected within the time period or time frame.

In some embodiments, the server 202 can detect a login event 224 at one or more client devices 230 and/or one or more applications 232. For example, a login event 224 can include, but not limited, to a user logging in or authenticating to a client device 230 or application 232. The server 202 can collect data from the login event 224 including the client device 230, the application 232, the user identifier 214, and/or the credential 210 provided with the user identifier 214. In embodiments, the server 202 can update the login history 216 for a user responsive to a login event 224.

The listing 220 can include can include in a table or list mapping the client devices 230 associated with the user to the applications 232 associated with the user. In some embodiments, the listing 220 can include one or more client devices 230 and/or one or more applications 232 associated with a particular credential 210 and user identifier 214 (e.g., still using the particular credential 210 with the user identifier 214). The server 202 can generate the listing 220 based in part on the login history 216 and user activities of the respective user collected by the server 202. For example, the server 202 can periodically update the listing 220 responsive to updates to the login history 216 for user. In some embodiments, the listing 220 can map the one or more applications 232 accessed by the user to the respective client device 230 or client devices 230 the user accessed the application 232 from or authenticated from. The listing 220 can include a status 222 for one or more applications 232 included within the listing 220 and/or one or more client devices 230 included within the listing 220. The status 222 can indicate whether a credential 210 for a user has been updated for the respective application 232 and/or at the respective client device 230. In some embodiments, the status 222 can include a first status indicating "not updated", a second status indicating "updated", or a third status indicating "remove" for the user to remove the application 232 and/or the client device 230 from the listing 220. The server 202 can generate multiple listings 220. For example, the listings 220 can change or be modified responsive to a user registering a new client device 230, removing a client device 230, adding a new application 232, removing an application 232 or responsive to changes to a status 222 of one or more applications 232 and/or one or more client devices 230 included within a listing 220. In some embodiments, the listings 220 can be modified responsive to a login event 224 by a user to one or more client devices 230 and/or one or more applications 232.

The server 202 can include a credential manager 208. The credential manager 208 can maintain, manage and/or update credentials 210 for one or more users. The credential manager 208 cam execute or perform the functionalities of method 300. The credential manager 208 can include one or more processors 204 and one or more storage devices 206. For example, the credential manager 208 can maintain and store the credentials 210 for each user in the storage device 206. The credentials 210 can be maintained and organized based on the user identifier 214 associated with the credential 210. For example, each user can have one or more user identifiers 214 unique to the respective user and one or more credentials 210 (e.g., passwords) associated with at least one user identifier 214 and used to authenticate to one or more client devices 230 and/or one or more applications 232. The credential manager 208 can maintain the credentials 210 with the corresponding user identifiers 214 until a modification 212 is received for the credential 210. The credential manager 208 can maintain a credentials 210 with the corresponding user identifier 214 and the most recent modification 212 until the modification 212 has been received at the one or more client devices 230 associated with the user and the credential 210 has been updated with the modification 212 at the one or more applications 232 associated with the user. In some embodiments, the credential manager 208 can determine that the credential 210 has been updated with the modification 212 at each of the one or more client devices 230 and the one or more applications 232 associated with the user and can update the credential 210 (e.g., original credential, previous credential, first credential) at the server 202 with the modification 212 and remove the previous credential 210.

Client devices 230 can include any form of a computing device described herein. For example, client device 230 can the same as computing device 101 described above with respect to FIG. 1A and/or clients 162 described above with respect to FIG. 1B. The client devices 230 can connect with the server 202 through one or more connections 252. For example, the client devices 230 can establish a connection 252 to the server 202 to access an application 232 and/or access a credential 210 associated with a user of the client device 230. The connections 252 can include a channel, connection or session between the server 202 and one or more client devices 230. In some embodiments, the connections 252 can include encrypted and/or secure connections 252 between the server 202 and a client device 230. For example, the connections 252 may include encrypted sessions and/or secure sessions established between the server 202 and a client device 230. The encrypted connections 252 can include encrypted files, data and/or traffic transmitted between the server 202 and a client device 230.

The applications 232 may include network applications that are served from and/or hosted on one or more servers (e.g., server 202, remote servers, application servers). The applications 232 can include an application hosted on at least one server and accessed by at least one client device 230 via a network 250. The applications 232 can include, but not limited to, a web application, a desktop application, remote-hosted application, a virtual application, a software as a service (SaaS) application, a mobile application, an HDX application, a local application, a native application (e.g., native to the client device), and/or a device couple with one or more of the client devices 230.

An agent 240 may be executing at or deployed at the client devices 230. In some embodiments, at least one agent 240 can be executing at or deployed at each of the client devices 230 for the client device 230 to connect to or interact with the server 202. The agents 240 may be implemented using hardware, software or a combination of hardware and software. The agent 240 can include a client agent and can establish one or more connections 252 from a client device 230 to the server 202 through network 250 for establishing and exchanging communications between the client device 230 and the server 202. The agent 240 can establish one or more connections 252 from a client device 230 to one or more applications 232 through network 250 for establishing and exchanging communications between the client device 230 and the one or more applications 232. The agent 240 can monitor user identifiers 214, credentials 210 and/or modifications 212 transmitted from a client device 230 to an application 232 for authenticating to the application 232. In some embodiments, the agent 240 can intercept or identify the user identifiers 214, credentials 210 and/or modifications 212 transmitted from a client device 230 to an application 232 for authenticating to the application 232 (e.g., login event 224) and provide the user identifiers 214, credentials 210 and/or modifications 212 to the server 202 and/or the credential manager 208.

The agent 240 can include or provide a credential console 242. The credential console 242 can a command, instruction, script, task or any type and form of executable instructions for a user of a client device 230 to access one or more credentials, manage one or more credentials and/or modify/update one or more credentials 210, for example, via the server 202 or credential manager 208. The credential console 242 can include or provide a prompt or user interface (e.g., window) for a user to access one or more credentials, manage one or more credentials and/or modify/update one or more credentials 210, for example, via the server 202 or credential manager 208.

The agent 240 can include one or more processors 246 such as but not limited to processor(s) 103 described above with respect to FIG. 1A or processors 204. The one or more processors 246 can execute or perform part of or all of the functionalities of the method 300. The agent 240 can include one or more storage devices 244 (e.g., memory). For example, the agent 240 can include a storage device 244 or memory coupled with one or more processors 246. The storage devices 244 can be the same as or similar to memory 122, 128 described above with respect to FIG. 1A or storage devices 206. The agent 240 can store and maintain the user identifiers 214, credentials 210 and/or modifications 212 from one or more login events 224 in the storage device 244.

Network 250 may be a public network, such as a wide area network (WAN) or the Internet. In some embodiments, network 250 may be a private network such as a local area network (LAN) or a company Intranet. Network 250 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, network 250 can be the same as or substantially similar to network 164 described above with respect to FIG. 1B.

Figure 2B:
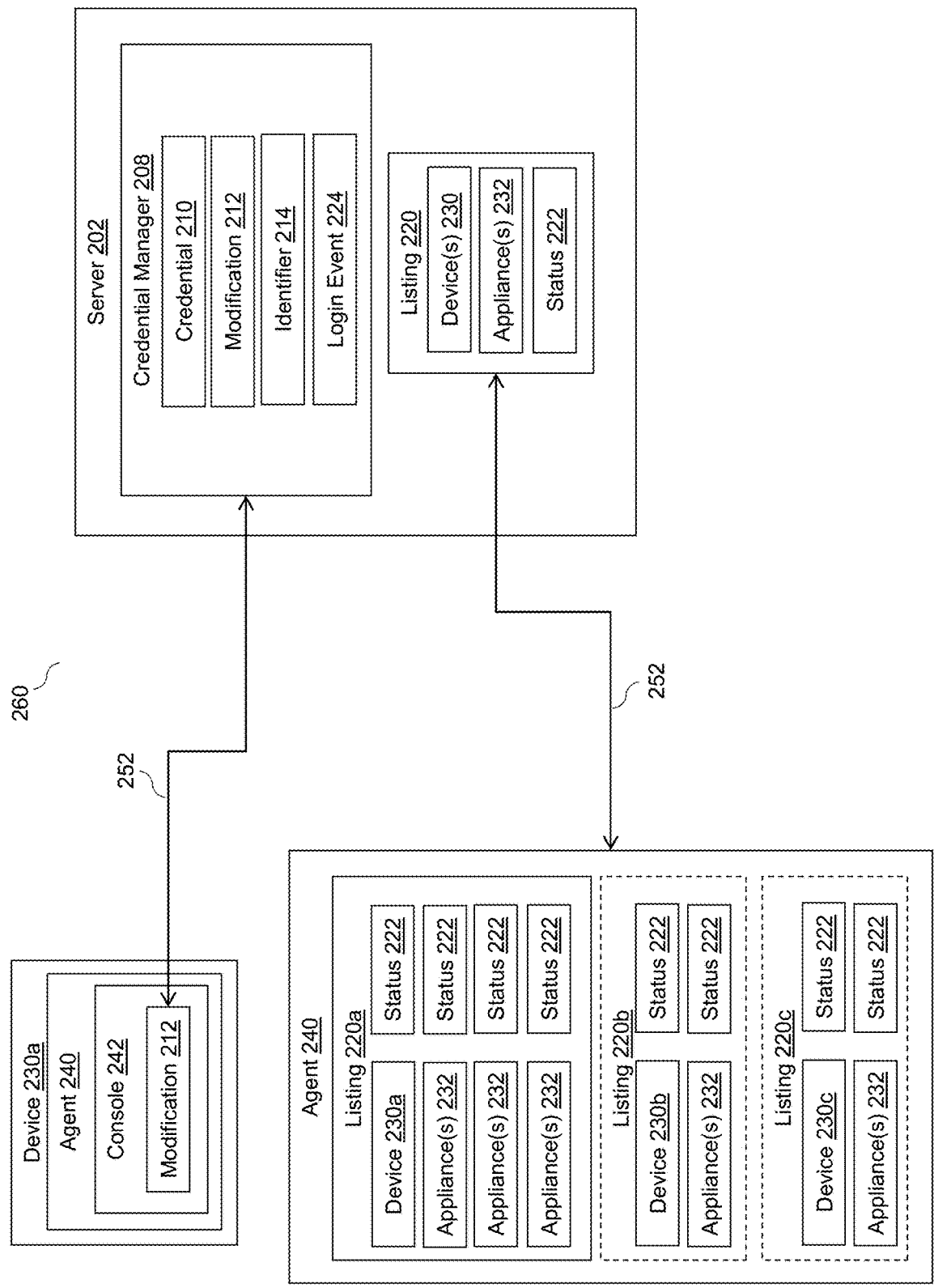
FIG. 2B is a block diagram of a system for modifying a credential of a user among a plurality of client devices associated with the user, according to an example implementation of the present disclosure.

Referring now to FIG. 2B, an example system 260 for communicating a modification 212 to a credential 210 to a plurality of client devices 230 associated with a user is provided. A modification 212 to a credential 210 can be received at a first client device 230*a* through a credential console 242 of an agent 240 executing at the first client device 230 and connected to the server 202. For example, the user can be logged in or connected to the server 202 and/or credential manager 208 through the credential console 242 of the agent 240 and request to change the credential 210 or be prompted to change the credential 210. In embodiments, the modification 212 can include a change or modification to the credential 210 (e.g., password change) for a user identifier 214 associated with a user. For example, the modification 212 can include changing a first credential 210 to a second credential 210. The agent 240 on the first client device 230 can transmit or provide the modification 212 to the server 202 through an encrypted connection 252 and/or encrypt the modification 212 prior to transmitting the modification 212 to the server 202. The agent 240 can request a login history 216 for the user and/or a listing 220 of one or more devices 230 and/or one or more applications 232 still using or associated with the first credential 210 (e.g., previous credential).

The credential manager 208 of the server 202 can receive the modification 212 and identify a login history 216 for the user based in part on the user identifier 214 for the user. The credential manager 208 can generate one or more listings 220 identifying one or more devices 230 and/or one or more applications 232 still using or associated with the first credential 210. In some embodiments, the credential manager 208 can generate a first listing 220*a* for a first client device 230*a* that includes or lists one or more applications 232 associated with the first client device 230*a*, accessed from the first client device 230*a* and/or local to the first client device 230*a*. The first listing 220*a* can include a status 222 for the first client device 230*a* and the one or more applications 232. The credential manager 208 can transmit the first listing 220*a* to the agent 240 on the first client device 230*a*.

The agent 40 can provide or display the first listing 220*a* to the user of the first client device 230*a*. In some embodiments, the status 222 can be provided in the form of an icon or interactive element that a user can interact with to select one or more applications 232 to be provided the modification 212 to the first credential 210. For example, the agent 240 can receive an indication of a user interaction with one or more statuses 222 of one or more applications 232 indicating the applications 232 the user wishes to update the credential 210 for using the modification 212. In embodiments, the agent 240 can update the credential 210 with the modification 212 for the selected one or more applications 232 of the first client device 230*a*. The agent 240 can transmit a response or indication to the credential manager 208 identifying the applications 232 that the credential 210 has been updated with the modification 212. In some embodiments, the agent 240 can transmit a response or indication to the credential manager 208 identifying the applications 232 that the credential 210 was not updated with the modification 212 or identifying unsuccessful attempts to upgrade the credential 210 and the corresponding application 232. The agent 240 can update a status 222 for the applications 232 responsive to the credential 210 being upgraded for the respective application 232.

The credential manager 208 can determine one or more other client devices 230 (e.g., not the first client device 230*a*) associated with the user and still using the first credential 210. The credential manager 208 can generate one or more listings 220 for the one or more other client devices 230. For example, in some embodiments, the credential manager 208 can generate a second listing 220*b* for a second client device 230*b* associated with the user and a third listing 220*c* for a third client device 230*c* associated with the user. The number of listings 220 can vary based in part on the number of client devices 230 associated with the user. In some embodiments, the credential manager 208 can generate a single listing 220 that includes multiple client devices 230 and respective applications 232 associated with the client devices 230. The credential manager 208 can transmit the single listing 220 to each of the agents 240 on the multiple client devices 230.

The second listing 220b can include a status 222 for the second client device 230b and the one or more applications 232 associated with the second client device 230b. The third listing 220c can include a status 222 for the third client device 230c and the one or more applications 232 associated with the third client device 230c. The credential manager 208 can transmit the second listing 220b to the agent 240 on the second client device 230b and the third listing 220c to the agent 240 on the third client device 230c.

The agents 40 on the respective client devices 230a, 230b can provide or display the listings 220b, 220c to the user of the client devices 230b, 230c. The agents 240 can receive an indication of a user interaction with one or more statuses 222 of one or more applications 232 indicating the applications 232 the user wishes to update the credential 210 for using the modification 212 for the respective client devices 230b, 230c. In embodiments, the agents 240 can update the credential 210 with the modification 212 for the selected one or more applications 232 of the respective client devices 230a. The agents 240 can transmit a response or indication to the credential manager 208 identifying the applications 232 that the credential 210 has been updated with the modification 212. In some embodiments, the agents 240 can transmit a response or indication to the credential manager 208 identifying the applications 232 that the credential 210 was not updated with the modification 212 or identifying unsuccessful attempts to upgrade the credential 210 and the corresponding application 232. The agents 240 can update a status 222 for the applications 232 responsive to the credential 210 being upgraded for the respective application 232. The credential manager 208 and the agents 240 on the client devices 230 associated with the user can continue to communicate the modification 212 to the credential 210 to the client devices 230 associated with the user and the applications 232 associated with the user until each of the client devices 230 and/or applications 232 have been provided the modification 212 and the credential 210 has been upgraded for the respective the client devices 230 and/or applications 232 or until the user requests that upgrades stop or discontinue.

Each of the above-mentioned elements or entities is implemented in hardware, or a combination of hardware and software, in one or more embodiments. Each component of the server 202 may be implemented using hardware or a combination of hardware or software detailed above in connection with FIGS. 2A-2B. For instance, each of these elements or entities can include any application, program, library, script, task, service, process or any type and form of executable instructions executing on hardware of a server 202 or agent 240. The hardware includes circuitry such as one or more processors in one or more embodiments. In some embodiments, the components of at least one server 202 or agent 240 may be implemented or include a non-transitory computer-readable medium that includes instructions that, when executed by a processor of the respective server 202 or agent 240 cause the processor to execute or perform the functionalities of the method 300.

Figure 3A:
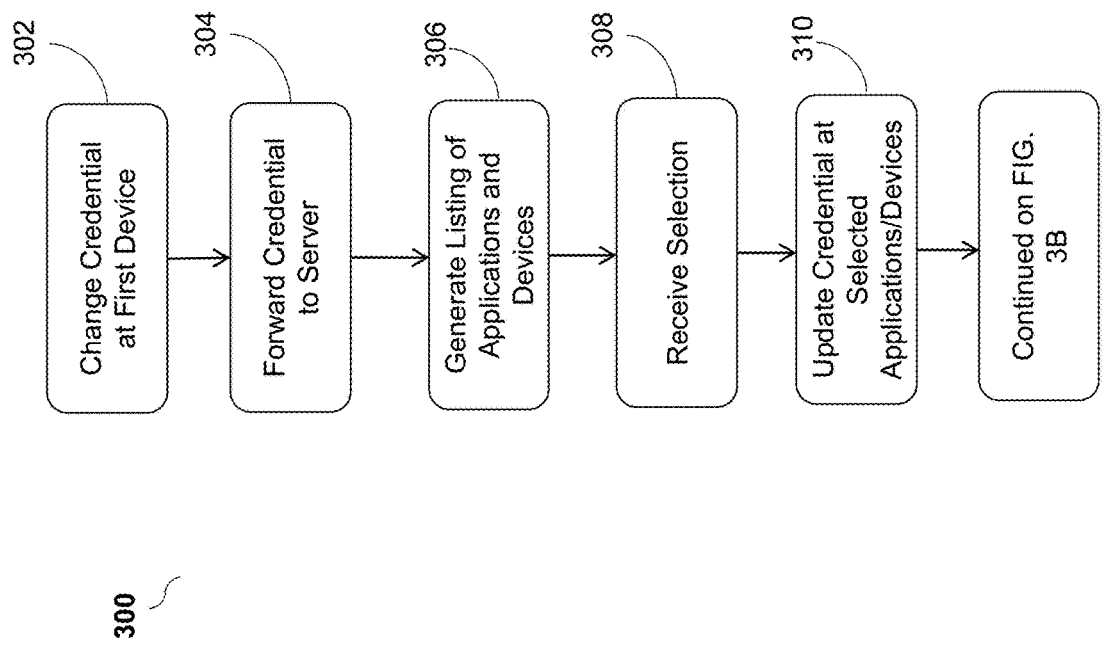
FIGS. 3A-3C include a flow chart illustrating a process or method for credential control among a plurality of client devices, according to an example implementation of the present disclosure.
Figure 3B:
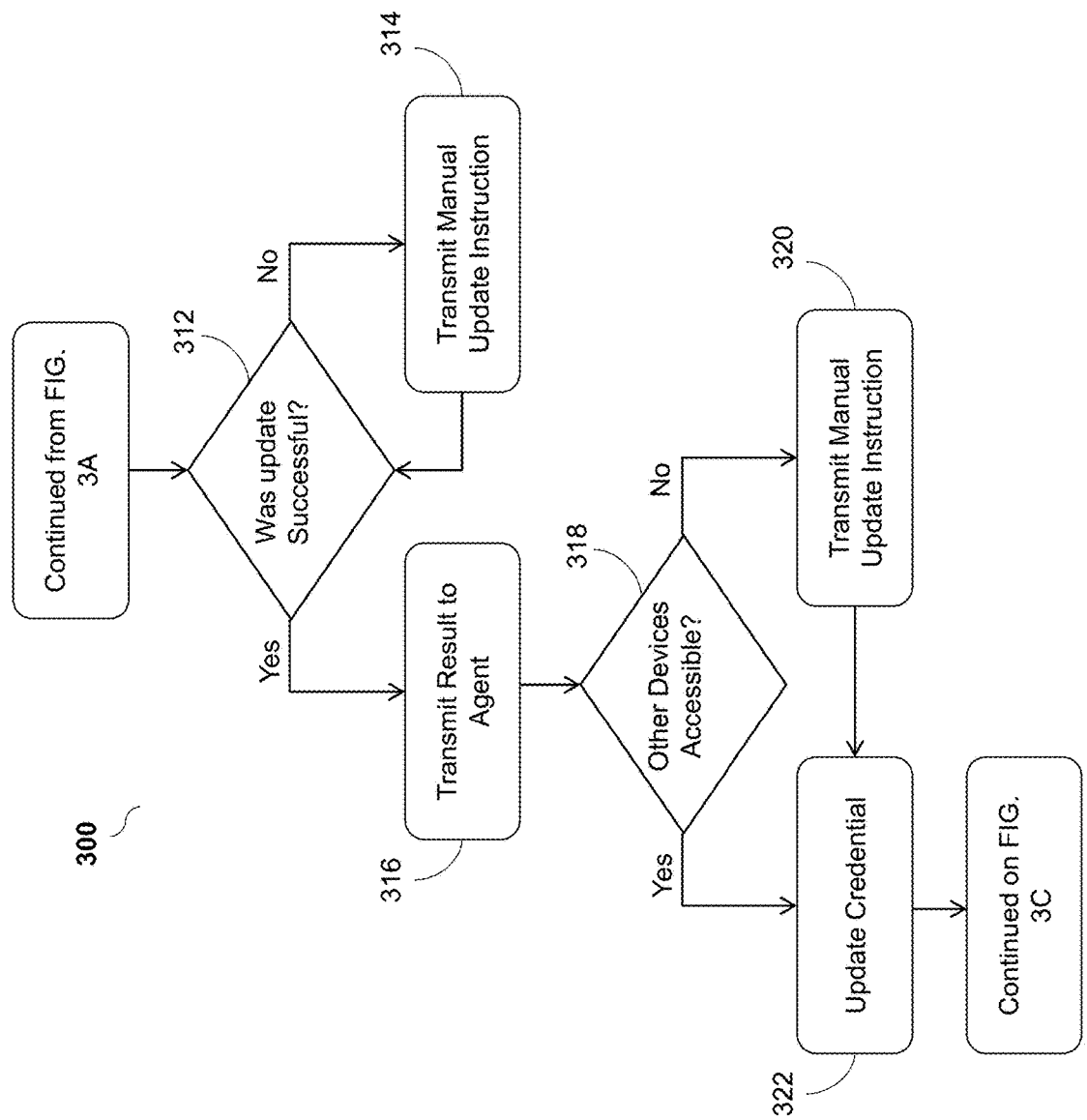
Figure 3C:
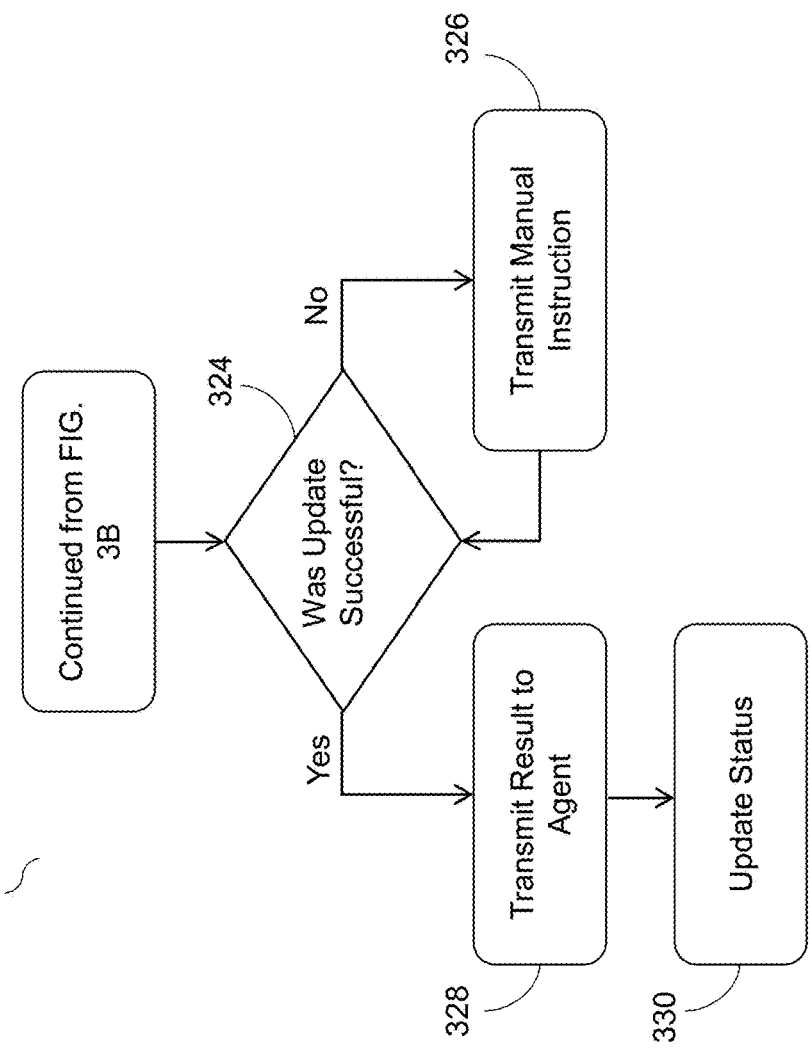

Referring now to FIGS. 3A-3C, a method 300 for credential control for a plurality of client devices associated with a user is depicted. In brief overview, the method 300 can include one or more of: changing a credential at a first device (302), forwarding the credential modification to a server (304), generating a listing of applications and devices (306), receiving a selection (308), updating the credential at selected applications and/or devices (310), determining if the update was successful (312), if not, transmitting manual update instructions (314), if so, transmitting the results to an agent on the first device (316), determining if other devices are accessible to receive the modification (318), if not, transmitting manual update instructions (320), if so, update credential at device(s) (322), determining if the update was successful (324), if not, transmitting manual update instructions (326), if so, transmitting the results to an agent on the first device (328), updating a status of applications and/or devices (330). Any of the foregoing operations may be performed by any one or more of the components or devices described herein, for example, the server 202, processor 204, credential manager 208 or agent 240.

Referring to 302, and in some embodiments, a modification 212 to a credential 210 can be received at a first client device 230 (hereinafter "client device"). A user can change, update or modify a credential 210 (e.g., password, authentication code) at least one client device 230 associated with the user. The credential 210 can be used to authenticate or access to an application 232 executing on the client device 230 and be associated with at least one identifier 214 (e.g., username, user identifier) associated with the user. For example, in some embodiments, the user can enter the identifier 214 and the credential 210 to authenticate to and access the application 232. In embodiments, the user can be prompted to change the credential 210 based in part on a security protocol (monthly password updates, updates after determined number of login events) or simply decide change the credential 210. The change to the credential 210 can be referred to herein as a modification 212. For example, the user can provide a modification 212 (e.g., new credential) to change a first credential 210 to a second, different credential 210.

In some embodiments, an agent 240 can be executing on the client device 230 and the agent 240 can receive a modification 212 of a first credential 210 to change the first credential 210 to a second credential 210, different from the first credential 210, for an identifier 214 associated with a user of the first client device 230. The agent 240 can be installed on the client device 230 or provided to the client device 230 by a server 202. The agent 240 can detect, identify or receive modifications 212 to credentials 210 on the respective client device 230 the agent 234 is executing on. In some embodiments, the agent 240 can include or correspond to a credential agent 240 to manage credentials 210 for a client device 230.

The agent 240 can include a credential console 242, storage 244 and a processor 246 (e.g., credential manager). The credential console 242 can include or provide a prompt or user interface (e.g., window) for a user to access one or more credentials, manage one or more credentials and/or modify/update one or more credentials 210. In embodiments, the user can access the agent 240 to update or change a credential 210. For example, the agent 240 can receive a modification 212 to the credential 210. In some embodiments, the agent 240 can detect that the user has modified a credential via an application 232 executing on the device 230. The agent 240 can store the modification 212 to the credential in the storage device 244 of the agent 240 and/or a storage device of the client device 230.

In some embodiments, the agent 240 can include or execute an automation tool to identify a modification 212 to a credential 210. The automation tool can identify the modification 212 entered via, for example, a menu bar or login interface of the credential console 242 or of an application 232. The agent 240, through the automation tool, can navigate to the respective login interface and determine, retrieve or identify the modification 212 to the credential 210 and store the modification 212 and the identifier 214 associated with the credential 210 in a storage device 244 of the agent 240 or the client device 230. In some embodiments, responsive to a keyboard event and a table key, the agent 240 can store the modification 212 and the identifier 214 associated with the credential 210 in the storage device 244 of the agent 240 or the client device 230.

Referring to 304, and in some embodiments, the modification 212 to the credential 210 can be forwarded to the server 202. The modification 212 can be transmitted from the client device 230 the modification 212 was received at or performed at to the server 202. In some embodiments, the server 202 can receive a modification 212 to a credential 210 for an identifier 214 associated with a user of an application 232 accessed via a first client device 230. The credential 210 can be used authenticating to the application 232 of one or more applications 232 accessed by the user across a plurality of client devices 230. The server 202 can receive the modification 212 from the agent 240. In some embodiments, the server 202 can store and maintain the modification 212 to the credential 210 to a login history 216 for the user. The login history 216 can identify the plurality of client devices 230 and the one or more applications 232 accessed via the plurality of client devices 230 by the user using the credential 210 and/or login events 224 of the user with the credential 210.

The agent 240 can transmit the modification 212 and include a request for a listing 220 identifying one or more applications 232 and/or one or more client devices 230 associated with the user and still using the old, previous or unmodified credential 210. In embodiments, the agent 240 can transmit to the server 202 a request for a login history 216 for the user and associated with the credential 210. The login history 216 can include the plurality of applications 232 accessed by the user using the first credential 210 within a determined time period (e.g., previous 3 months, previous 6 months, previous year) and a plurality of client devices 230 associated with the user and accessed using the first credential 210 with the determined time period. The listing 220 can include one or more applications 232 and/or one or more client devices 230 that the need to update the credential 210 to include the modification 212. In some embodiments, the agent 240 can transmit a request for an encryption credential from the server 202 to encrypt the modification 212 prior to transmitting the modification 212 to the server 202. The agent 240 can encrypt the second credential 210 (e.g., modified credential) or modification 212 and transmit the encrypted second credential or encrypted modification to the server 202 to be stored in a user profile for the user at a database (e.g., storage device) of the server 202. For example, the agent 240 can receive the encryption credential, encrypt the modification 212 and/or the identifier 214 with the encryption credential and transmit the encrypted data (e.g., encrypted modification 212, encrypted identifier 214) to the server 202. In some embodiments, the agent 240 can transmit the encrypted data (e.g., encrypted modification 212, encrypted identifier 214) to the server 202 through an encrypted connection 252 between the client device 230 and the server 202.

Referring to 306, and in some embodiments, a listing 220 of applications 232 and devices 230 can be generated. The server 202 can generate and maintain the listing 220 to map the one or more applications 232 accessed by the user using the credential 210 to respective ones of the plurality of client devices 230 according to a login event 224 at the respective ones of the plurality of client devices 230 using the credential 210. A login event 224 can include, but not limited to, a login or authentication to an application 232 at a client device 230. The server 202 can store the identifier 214 and credential 210 used for the login event in the storage device 206 of the server 202.

In some embodiments, the server 202 can identify, using the login history 216, one or more client devices 230 of the plurality of client devices 230 through which the application 232 of the one or more applications 232 is accessed by the user using the credential 210. The server 202 can generate the listing 220 based in part on the login history 216. For example, the server 202 can identify the client devices 230 and/or applications 232 still using or still associated with the previous credential 210 and include the identified client devices 230 and/or applications 232 in the listing 220.

The server 202 can provide or transmit the listing 220 to the agent 240 on the client device 230. The agent 240 can provide the listing 220 to the user through a user interface, window or prompt generated via the client device 230. In some embodiments, the agent 240 can provide to the user via the first client device 230 or a client device 230 that the user is actively using, a listing 220 identifying a plurality of applications 232 accessed by the user using the first credential and accessible via the first client device 230. For example, the listing 220 can include applications 232 executing on the first client device 230 or accessible via the first client device 230 and hosted on the server 202 or one or more remote devices different from the client device 230. The active client device 230 can be the same client device 230 the modification 212 was transmitted from or can be a different client device 230, such as, if the user has changed devices 230 since the modification 212 was provided.

In some embodiments, the agent 240 can provide to the user of the client device 230 the listing 220 identifying a plurality of client devices 230 (e.g., mobile phone, tablet device, desktop, laptop, personal computer) associated with the user and accessed using the first credential 210. For example, the listing 220 can include each client device 230 the user has previously used to access an application 232, the server 202 or has registered with the server 202. In some embodiments, the agent 240 can provide to the user of the client device 230 the listing 220 identifying a plurality of applications 232 accessed using one or more client devices 230 associated with the user and accessed using the first credential 210. For example, the listing 220 can include each application 232 the user has previously accessed or interacted with or has registered with the server 202.

Referring now to 308, and in some embodiments, a selection can be received. The agent 240 can receive a selection of at least one application 232 and/or client device 230 to update the credential 210 with the modification 212. For example, the user can select one or more applications 232 and/or one or more client devices 230 that are still using the previous credential 210 and that the user wants to update the previous credential 210 with the modification 212 at the respective application 232 and/or client device 230. The selection can include individual applications 232, individual client devices 230 or a combination of applications 232 and client device 230. The agent 240 can provide or transmit the selection to the server 202. In some embodiments, the server 202 can receive, via the agent 240 executing on the first client device 230, the selection indicating at least one application 232 of the plurality of applications 232 to communicate the modification 212 to the credential 210 for the at least one application 232 via at least one client device 230 of the plurality of client devices 230.

In embodiments, the agent 240 can provide a selection of one or more client devices 230 of the plurality of client devices 230 to update the first credential 210 to the second credential 210 at the one or more client devices 230. The agent 240 can generate, display or provide the listing 220 that includes one or more applications 232 and/or one or more client devices 230 associated with the user and that are still using the previous credential 210. The listing 220 can include a status 222 for each of the applications 232 and/or client devices 230 included within the listing 220. For example, the status 222 can identify if the modification 212 to the credential 210 has been updated at the respective application 232 and/or client device 230. In one embodiments, the status 222 can include "updated," "not updated", or "removed." The listing 222 can be generated to include an icon for each of the one or more applications 232 and/or client devices 230. In some embodiments, the listing 220 can include one or more applications 232 and indicate one or more client devices 230 mapped with or linked with the respective application 232. For example, the listing 220 can indicate the one or more client devices 230 the user has previously used to access the respective application 232. The agent 240 can receive a user selection responsive to a user interaction with the listing 220 via a user interface (e.g., graphical user interface, touchscreen, display) and/or an input device (e.g., mouse, keyboard, microphone, one or more sensors) connected with the client device 230. The user interaction can include an interaction with an item, icon or content within the listing 222 and corresponding to at least one application 232 and/or client device 230. For example, in one embodiments, the user interaction can include a selection of an application 232 by moving a pointer of an input device (e.g., mouse) over an icon corresponding to or representing the respective application 232 in the listing 220 and clicking on the respective application 232. The agent 240 can receive a selection of one or more applications 232 of the plurality of applications 232 from the listing 220 and/or a selection of one or more client devices 230 of the plurality of client devices 230 from the listing 220. The agent 240 can transmit or forward the selected one or more applications 232 and/or one or more client devices 230 to the server 202.

Referring now to 310, and in some embodiments, the credential 210 can be updated at the selected application(s) 232 and/or device(s) 230 with the modification 212. In some embodiments, the server 202 can communicate or transmit the modification 212 to the credential 210 to one or more client devices 230 for authenticating the user using the modified credential 210 to access one or more applications 232 on each of the one or more client devices 230. The server 202 can receive the selected applications 232 and identify one or more client devices 230 associated with the selected applications 232. For example, the server 202 can determine the client devices 230 that the user uses to access or interact with the selected applications 232 and communicate or transmit the modification 212 to the credential 210 to the determined client devices 230. The credential 210 (e.g., previous credential) can be updated with the modification 212 for the selected application 232 at the client device 230. In some embodiments, the server 202 can update the credential 210 (e.g., previous credential) with the modification 212 for the selected application 232 at the client device 230. The server 202 can update the credential 210 to include the modification 212 at the one more client devices 230 associated with the user and connected to the server 202.

In some embodiments, the server 202 can communicate or transmit the modification 212 to the credential 210 to an agent 240 executing on or deployed at the respective client device 230. The agent 240 can update the credential 210 (e.g., previous credential) with the modification 212 such that the credential 210 is updated for the selected application 232 at the client device 230. The agent 240 can change the first credential 210 (e.g., previous credential) to a second credential 210 using the modification 212 for the selected one or more applications 232 of the plurality of applications 232 at the first client device 230. In some embodiments, the server 202 can encrypt the modification 212 to the credential 210 and transmit an encrypted modification 212 to the client devices 230. In embodiments, the server 202 can transmit the encrypted modification 212 to one or more client devices 20 through an encrypted connection 252 between the server 202 and the respective one or more client devices 230.

Referring now to 312, and in some embodiments, a determination can be made if the update was successful at the first client device 230. The server 202 or an agent 240 executing on the first client device 230 or active client device 230 can determine if the update to the credential 210 was successful at the client device 230. The agent 240 executing on the client device 230 can push or modify the credential 210 for one or more applications 232 accessible via the client device 230 with the modification 212. For example, the agent 240 can change or modify a first credential 210 to a second, different credential 210 using the modification 212. The agent 240 can update the first credential 210 with the modification 212 to generate the second, different credential 210 such that the user authenticates to the one or more applications 232 using the second modification 212 responsive to the update. In some embodiments, the agent 240 can determine if the first credential 210 was updated to the second credential 210 at the selected one or more applications 232 of the plurality of applications 232 at the first client device 230 and provide, to the server 202, an indication that the first credential 210 was updated the second credential 210 at respective ones of the selected one or more applications 232 of the plurality of applications 232 at the first client device 230. The agent 240 can determine that the update was successful and generate an indication for the server 202 to indicate that the credential 210 has been updated with the modification 212 at the respective client device 230 and/or for the selected one or more applications 232. The server 202 can receive via the agent 240 executing on the client device 230 (e.g., first client device), the indication that the credential was updated for at least one application executing on the client device 230 (e.g., first client device). In some embodiments, the agent 240 can transmit an indication of one or more applications 232 that the update was not successful and that are still using or associated with the previous credential 210 or first credential 210. The server 202, responsive to the indication, can determine that the credential 210 has been updated with the modification 212 for the one or more applications 232 provided by the first client device 230 or active client device 230.

Referring now to 314, and in some embodiments, the server 202 can determine the update was not successful at the first client device 230 or active client device 230 and can generate instructions to update the credential 210 with the modification 212. The server 202 can determine that the modification 212 to the credential 210 was unsuccessful at the first client device 230 for at least one application 232 of the one or more applications 232 accessed by the user. The server 202 can receive an indication from an agent 240 at the first client device 230 or active client device 230 that the credential 210 was not updated with the modification 212 or the server 202 can determine that the update was unsuccessful. In some embodiments, the server 202 can receive an indication from an agent 240 at the first client device 230 or active client device 230 that the credential 210 was not updated with the modification 212 for one or more applications 232 provided by the client device 230. The agent 240 can determine that the first credential 210 did not update to the second credential 210 at the selected one or more applications 232 of the plurality of applications 232 at the first client device 230. The agent 240 can receive, from the server 202, an instruction to manually update the first credential 210 to the second credential 210 for respective ones of the selected one or more applications 232 of the plurality of applications 232 at the first client device 230. In some embodiments, the server 202 can determine that the update was unsuccessful because the agent 240 and/or client device 230 could not be reached or a connection 252 between the server 202 and the client device 230 was disconnected or ended. The server can detect or determine that a first group of client devices 230 of the plurality of client devices 230 associated with the user are offline or unavailable from the server 202. In embodiments, the server 202 can update the credential 210 to include the modification 212 at the first group of client devices 230 of the one or more client devices 230 responsive to the status 222 of respective ones of the first group of client devices 230 changing from offline to online. For example, the server 202 can determine the client device 230 is off, offline or otherwise inaccessible via the network 250. Thus, the server 202 cannot communicate or transmit the modification 212 to the respective client device 230 and/or the agent 240 on the client device 230 and the server 202 can determine the update was unsuccessful for the client device 230 and/or one or more applications 232 accessed using the client device 230. In embodiments, the application 232 can be inaccessible or offline and the agent 240 can be prevented from updating the credential 210 with the modification 212 for the application 232. The agent 240 can generate the indication to indicate that the update was unsuccessful for the client device 230 and/or one or more applications 232.

The server 202, responsive to the unsuccessful update, can generate update instructions (e.g., manual update instructions) for the respective client device 230 for a user to update the credential 210 with the modification 212 at the respective client device 230 and for one or more applications 232 manually or independent of the server 202. The server 202 can provide to the agent 240 executing on the first client device 230 an instruction to update the credential at the first client device 230 for the at least one application 232 of the one or more applications 232 accessed by the user. For example, the instructions can include an instruction, a prompt, a command window, code or interface to instruct the user that the credential 210 has not been updated with the modification 212 for the client device 230 and/or one or more applications 232 accessed via the client device 230. The instructions can include commands for the user to update the credential with the modification 212 the next or subsequent time the respective client device 230 is online or connects to the server 202. The instructions can include commands for the user to update the credential with the modification 212 for one or more applications 232 the next or subsequent time the respective client device 230 connects to the one or more applications 232. In some embodiments, the instruction can include a listing identifying the client device 230 and/or one or applications 232 that the credential 210 needs to be updated with the modification 212.

Referring now to 316, and in some embodiments, the server 202 can determine that update was successful and transmit the results to the agent 240 at the first client device 230 or one or more active client devices 230. The server 202 can receive the indication from the agent 240 at the first client device 230 and/or one or more active client devices 230 (e.g., device the user is actively or current using and connected to the server) that the credential 210 updated with the modification 212. The indication can identify the one or more applications 232 that the credential 210 was updated with the modification 212 for. The indication can identify the client device 230 where the credential 210 was updated with the modification 212.

In some embodiments, the server 202 can update the login history 216 for the user to indicate the credential 210 was updated to include the modification 212 for at least one application 232 executing on the first client device 230. The server 202 can generate results or updates to a status 222 for the client device 230 and one or more applications 232 and transmit the results or updates to the status 222 to the agent 240. In some embodiments, the server 202 can generate a listing 220 or update a previous listing 220 to include a status 222 for the plurality of client devices 230 and the one or more applications 232 accessed by the user across the plurality of client devices 230. The status 222 can be indicative of the modification 212 to the credential 210 being received at respective ones of the plurality of client devices 230 and the one or more applications 232. In some embodiments, the agent 240 can update the status 222 for the client device 230 and/or the one or more applications 232 included in the listing 220 and provided to the user to inform the user of which client device(s) 230 and/or application(s) 232 have had the credential 210 updated with the modification 212 successfully and/or unsuccessfully.

Referring now to 318, and in some embodiments, the server 202 can determine if other client device(s) 230 associated with the user are accessible or available to receive the modification 212. The server 202 can identify the client devices 230 associated with the user based in part on a user profile and/or the login history 216 for the user. In embodiments, the login history 216 can identify or indicate the client devices 230 that the user has accessed or used to connect to the server 202 and/or access one or more applications 232. The user can be active on a first client device 230 or the client device 230 that the user originally provided the modification 212 to the credential 210. The server 202 can determine the other client devices 230 (e.g., different from the first client device) and determine if the other client devices 230 are active, accessible or connected to the server 202. In some embodiments, the server 202 can poll or check one or more active connections 252 to determine the client devices 230 connected to the server 202 through the one or more active connections 252. The client devices 230 can be inaccessible or unable to be reached via the server 202, for example, but not limited to, if the respective client device 230 is off, offline or not connected to the server 202. The server 202 can transmit a request to each of the other client devices 230 to check or verify if the respective client device 230 is active or accessible to receive the modification 212 to the credential 210.

Referring now to 320, and in some embodiments, the server 202 can determine that one or more client devices 230 are inaccessible or unable to receive the modification 212. The server 202 can generate instructions (e.g., manual update instructions) for the respective client device 230 for a user to update the credential 210 with the modification 212 at the respective client device 230 and for one or more applications 232 manually or independent of the server 202. The server 202 can transmit or provide the instructions to the one or more client devices 230 at a next or subsequent time that the respective client device 230 connects to the server 202 or is accessible via the server 202. The instructions can include an instruction, a prompt, a command window, code or interface to instruct the user that the credential 210 has not been updated with the modification 212 for the client device 230 and/or one or more applications 232 accessed via the client device 230. The instructions can include commands for the user to update the credential with the modification 212 for one or more applications 232 the next or subsequent time the respective client device 230 connects to the one or more applications 232. In some embodiments, the instruction can include a listing identifying the client device 230 and/or one or more applications 232 that the credential 210 needs to be updated with the modification 212.

Referring now to 322, and in some embodiments, the server 202 can determine that one or more client devices are accessible and connected to the server 202 or can be reached or accessed via the server 202. The server 202 can communicate or transmit the modification 212 to the credential 210 to one or more client devices 230 that are accessible. The credential 210 (e.g., previous credential) can be updated with the modification 212 for one or more applications 232 associated with the user at the client device 230. In some embodiments, the server 202 can update the credential 210 (e.g., previous credential) with the modification 212 for the one or more applications 232 at the client device 230. The applications 232 can include, but not limited to, applications 232 identified in the login history 216 for the user. In embodiments, the server 202 can communicate or transmit the modification 212 to the credential 210 to an agent 240 executing on or deployed at the respective client device(s) 230. The agent 240 can update the credential 210 (e.g., previous credential) with the modification 212 such that the credential 210 is updated for the one or more applications 232 at the client device 230. The agent 240 can change the first credential 210 (e.g., previous credential) to a second credential 210 using the modification 212 for the one or more applications 232 at the client device 230. In some embodiments, the server 202 can encrypt the modification 212 to the credential 210 and transmit an encrypted modification 212 to the client devices 230 and/or an agent 240 at the client devices 230. In embodiments, the server 202 can transmit the encrypted modification 212 to one or more client devices 20 through an encrypted connection 252 between the server 202 and the respective one or more client devices 230.

Referring now to 324, and in some embodiments, a determination can be made if the update was successful at the one or more client devices 230. The server 202 or an agent 240 executing on the one or more client devices 230 can determine if the update to the credential 210 was successful at the respective ones of the one or more client devices 230. In some embodiments, the modification 212 can be applied to the credential 210 for each of the one or more other client devices 230 associated with the user or the modification 212 can be applied to the credential 210 for a subset or less than each of the one or more other client devices 230 associated with the user. A successful update can refer to or indicate that the credential 210 at the client device 230 has been modified or updated with the modification 212 or that a first credential 210 has been updated with the modification 212 to generate or form a second credential 210.

The agent 240 executing on the respective ones of the one or more client devices 230 can push or modify the credential 210 for one or more applications 232 accessible via the client device 230 with the modification 212. For example, the agent 240 can change or modify a first credential 210 to a second, different credential 210 using the modification 212. The agent 240 can update the first credential 210 with the modification 212 to generate the second, different credential 210 such that the user authenticates to the one or more applications 232 using the second modification 212 responsive to the update and via the respective client device 230. The agent 240 can determine that the update was successful and generate an indication for the server 202 to indicate that the credential 210 has been updated with the modification 212 at the respective client device 230 and/or for the one or more applications 232. The server 202 can receive via the agent 240 executing on the client device 230 (e.g., first client device), the indication that the credential was updated for at least one application executing on the client device 230 (e.g., first client device). In some embodiments, the server 202 can receive via multiple agents 240 executing on one or more client devices 230, one or more indications was updated for one or more applications 232 executing on or accessible via the one or more client devices 230. The server 202, responsive to the indication, can determine that the credential 210 has been updated with the modification 212 at the indicated one or more client devices 230 and/or for one or more applications 232.

Referring now to 326, and in some embodiments, the server 202 can determine that the update was not successful at the one or more client devices 230 and transmit instructions to the one or more client devices 230. The server 202 can receive an indication from an agent 240 at the one or more client devices 230 that the credential 210 was not updated with the modification 212 or the server 202 can determine that the update was unsuccessful. In some embodiments, the server 202 can determine that the update was unsuccessful because the agent 240 and/or client device 230 could not be reached or a connection 252 between the server 202 and the client device 230 was disconnected or ended. For example, the server 202 can determine the client device 230 is off, offline or otherwise inaccessible via the network 250. Thus, the server 202 cannot communicate or transmit the modification 212 to the respective client device 230 and/or the agent 240 on the client device 230 and the server 202 can determine the update was unsuccessful for the client device 230 and/or one or more applications 232 accessed using the client device 230. In embodiments, the application 232 can be inaccessible or offline and the agent 240 can be prevented from updating the credential 210 with the modification 212 for the application 232. The agent 240 can generate the indication to indicate that the update was unsuccessful for the client device 230 and/or one or more applications 232.

The server 202, responsive to the unsuccessful update, can generate update instructions (e.g., manual update instructions) for the respective client device 230 for a user to update the credential 210 with the modification 212 at the respective client device 230 and for one or more applications 232 manually or independent of the server 202. The instructions can include an instruction, a prompt, a command window, code or interface to instruct the user that the credential 210 has not been updated with the modification 212 for the client device 230 and/or one or more applications 232 accessed via the client device 230. The instructions can include commands for the user to update the credential with the modification 212 the next or subsequent time the respective client device 230 is online or connects to the server 202. The instructions can include commands for the user to update the credential with the modification 212 for one or more applications 232 the next or subsequent time the respective client device 230 connects to the one or more applications 232. In some embodiments, the instruction can include a listing identifying the client device 230 and/or one or more applications 232 that the credential 210 needs to be updated with the modification 212.

Referring now to 328, and in some embodiments, the server 202 can determine that the update was successful at the one or more client devices 230 and transmit results to one or more agents 240. The server 202 can determine that update was successful and transmit the results to the agents 240 at the one or more client devices 230. The server 202 can receive the indication from the agent 240 at the respective ones of the one or more client devices 230 that the credential 210 updated with the modification 212. The indication can identify the one or more applications 232 that the credential 210 was updated with the modification 212 for. The indication can identify the client device 230 where the credential 210 was updated with the modification 212. The server 202 can generate results or updates to a status 222 for the one or more client devices 230 and one or more applications 232 associated with the user and transmit the results to the agents 240 on the client devices 230.

Referring now to 330, a status 222 of one or more applications 232 and/or one or more client devices 230 can be updated. The server 202 can generate results or updates to a status 222 for the one or more client devices 230 and one or more applications 232 associated with the user and transmit the results to the agents 240 on the client devices 230. The server 202 can update the status 222 for each application 232 and/or each that the modification 212 to the credential 210 has been provided to and updated at. The server 202 can maintain or not update the status 222 for each application 232 and/or each client device 230 that the modification 212 to the credential 210 has not been provided at and thus, still needs to be updated. For example, in some embodiments, the server 202 can change a status 222 of an application 232 from a first status 222 indicating not updated to a second status 222 indicating updated. In embodiments, the server 202 can change a status 222 of a client device 230 from a first status 222 indicating not updated to a second status 222 indicating updated. The server 202 can maintain the status 222 of an application 232 and/or a client device 230 at the first status 222 indicating not updated that the modification 212 to the credential 210 has not been provided at and thus, still needs to be updated.

The server 202 can update a status 222 for a subset of applications 232 provided by a client device 230. In some embodiments, not all of the applications 232 provided by a device 230 may have been updated or still need to be updated. The server 202 can update a status of a subset of application out of the plurality of applications 232 provided by the client device 230 from a first status 222 indicating not updated to a second status 222 indicating updated and not update a status of the remaining applications 232 such that the status 222 of the remaining applications 232 is maintained at the first status 222 indicating not updated.

The server 202 can update or generate a new listing 220 indicating the status 222 for one or more applications 232 and/or one or more client devices 230 associated with the user. The server 202 can provide the updated or new listing 220 to at least one client device 230 or an agent 240 at the one or more client devices 230 the user is actively using or is connected with the server 202 to alert the user as to the status 222 for one or more applications 232 and/or one or more client devices 230 associated with the user.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method for credential control among a plurality of client devices, the method comprising:

receiving, by a server, a modification to a credential for an identifier associated with a user of an application accessed via a first client device, the credential modified by the user and used for authenticating the user to access the application of one or more applications accessed by the user across a plurality of client devices;

storing, by the server, the modification to the credential to a login history for the user, the login history identifying the plurality of client devices and one or more applications accessed via the plurality of client devices by the user using the credential;

identifying, by the server using the login history, one or more client devices of the plurality of client devices through which the application of the one or more applications is accessed by the user using the credential; and communicating, by the server responsive to receiving the modification of the credential and identifying the one or more client devices using the login history, the modification to the credential to the one or more client devices to indicate to the user to update the credential using the modified credential on each of the one or more client devices to reduce or prevent occurrences of the user being locked out from accessing the application responsive to the user modifying the credential.

2. The method of claim 1, comprising:
generating, by the server, a listing to map the one or more applications accessed by the user using the credential to respective ones of the plurality of client devices according to a login event at the respective ones of the plurality of client devices using the credential.

3. The method of claim 1, comprising:
receiving, by the server via an agent executing on the first client device, a selection indicating at least one application of the one or more applications to communicate the modification to the credential for the at least one application via at least one client device of the plurality of client devices.

4. The method of claim 1, comprising:
receiving, by the server via an agent executing on the first client device, an indication that the credential was updated for at least one application executing on the first client device.

5. The method of claim 1, comprising:
updating, by the server, the login history for the user to indicate the credential was updated to include the modification for at least one application executing on the first client device.

6. The method of claim 1, comprising:
determining, by the server, that the modification to the credential was unsuccessful at the first client device for at least one application of the one or more applications accessed by the user; and
providing, by the server to an agent executing on the first client device, an instruction to update the credential at the first client device for the at least one application of the one or more applications accessed by the user.

7. The method of claim 1, comprising:
generating, by the server, a listing that includes a status for the plurality of client devices and the one or more applications accessed by the user across the plurality of client devices, the status indicative of the modification to the credential being received at respective ones of the plurality of client devices and the one or more applications.

8. The method of claim 1, comprising:
updating, by the server, the credential to include the modification at the one or more client devices associated with the user and connected to the server.

9. The method of claim 1, comprising:
detecting, by the server, a first group of client devices of the plurality of client devices associated with the user are offline; and
updating, by the server, the credential to include the modification at the first group of client devices of the one or more client devices responsive to a status of respective ones of the first group of client devices changing from offline to online.

10. A method for credential control, the method comprising:
receiving, by an agent executing on a first client device, a modification of a first credential made by a user to change the first credential to a second credential for an identifier associated with the user of the first client device;
providing, by the agent to the user via the first client device, a listing identifying a plurality of applications accessed by the user using the first credential and accessible via the first client device;
receiving, by the agent, a selection of one or more applications of the plurality of applications from the listing; and
changing, by the agent responsive to receiving the modification of the first credential and the selection of one or more applications from the listing, the first credential to the second credential for the selected one or more applications of the plurality of applications at the first client device to reduce or prevent occurrences of the user being locked out from accessing the selected one or more applications responsive to the user modifying the first credential.

11. The method of claim 10, comprising:
providing, by the agent to the user of the first client device, the listing identifying a plurality of client devices associated with the user and accessed using the first credential; and
providing, by the agent to a server, a selection of one or more client devices of the plurality of client devices to update the first credential to the second credential at the one or more client devices.

12. The method of claim 10, comprising:
transmitting, by the agent to a server, a request for a login history for the user and associated with the first credential, the login history including the plurality of applications accessed by the user using the first credential within a determined time period and a plurality of client devices associated with the user and accessed using the first credential with the determined time period.

13. The method of claim 10, comprising:
encrypting, by the agent, the second credential; and
transmitting, by the agent to a server, the encrypted second credential to be stored in a user profile for the user at a database of the server.

14. The method of claim 10, comprising:
determining, by the agent, if the first credential was updated to the second credential at the selected one or more applications of the plurality of applications at the first client device; and
providing, by the agent to a server, an indication that the first credential was updated the second credential at respective ones of the selected one or more applications of the plurality of applications at the first client device.

15. The method of claim 10, comprising:
determining, by the agent, that the first credential did not update to the second credential at the selected one or more applications of the plurality of applications at the first client device; and
receiving, by the agent from a server, an instruction to manually update the first credential to the second credential for respective ones of the selected one or more applications of the plurality of applications at the first client device.

16. A system for credential control, the system comprising:
a server having one or more processors coupled to a memory, the one or more processors configured to:
receive a modification to a credential for an identifier associated with a user of an application accessed via a first client device, the credential modified by the user and used for authenticating the user to access the application of one or more applications accessed by the user across a plurality of client devices;
store the modification to the credential to a login history for the user, the login history identifying the plurality of client devices and one or more applications accessed via the plurality of client devices by the user using the credential;

identify, using the login history, one or more client devices of the plurality of client devices through which the application of the one or more applications is accessed by the user using the credential; and communicate, responsive to receipt of the modification of the credential and identification of the one or more client device using the login history, the modification to the credential to the one or more client devices to indicate to the user to update the credential using the modified credential on each of the one or more client devices to reduce or prevent occurrences of the user being locked out from accessing the application responsive to the user modifying the credential.

17. The system of claim 16, wherein the one or more processors are configured to:

generate a listing to map the one or more applications accessed by the user using the credential to respective ones of the plurality of client devices according to a login event at the respective ones of the plurality of client devices using the credential.

18. The system of claim 16, wherein the one or more processors are configured to:

receive, via an agent executing on the first client device, an indication that the credential was updated for at least one application executing on the first client device; and update the login history for the user to indicate the credential was updated to include the modification for the at least one application executing on the first client device.

19. The system of claim 16, wherein the one or more processors are configured to:

determine that the modification to the credential was unsuccessful at the first client device for at least one application of the one or more applications accessed by the user; and provide, to an agent executing on the first client device, an instruction to update the credential at the first client device for the at least one application of the one or more applications accessed by the user.

20. The system of claim 16, wherein the one or more processors are configured to:

detect a first group of client devices of the plurality of client devices associated with the user are offline; and update the credential to include the modification at the first group of client devices of the one or more client devices responsive to a status of respective ones of the first group of client devices changing from offline to online.

\* \* \* \* \*